March 31, 1970 — L. MAIOCCHI — 3,503,432

RESISTING STRUCTURE OF PNEUMATIC TIRES FOR VEHICLE WHEELS

Filed Nov. 14, 1966

INVENTOR
Luigi Maiocchi

ATTORNEYS

United States Patent Office 3,503,432
Patented Mar. 31, 1970

3,503,432
RESISTING STRUCTURE OF PNEUMATIC TIRES FOR VEHICLE WHEELS
Luigi Maiocchi, Milan, Italy, assignor to Pirelli Societa per Azioni, Milan, Italy
Filed Nov. 14, 1966, Ser. No. 593,996
Claims priority, application Italy, Dec. 18, 1965, 28,070/65
Int. Cl. B60c 11/02
U.S. Cl. 152—176     8 Claims

ABSTRACT OF THE DISCLOSURE

A pneumatic tire whose tread band includes a reinforcing structure comprising two layers of metal cords overlain by one layer of textile cords, the textile cords being pre-stressed in tension in the completed tire.

---

The present invention relates to pneumatic tires provided with an inextensible annular structure intended to stiffen the tread, and it is preferably applicable to pneumatic tires in which the tread can be separated from the carcass.

In tires of this type, the stiffening structure, which in the present description will be referred to as "armour," is subjected to tension stresses due to the inflation pressure.

In the case of automobile tires, which have a comparatively small size and which work under a reduced inflation pressure, the armour is generally constituted by strips of textile material, as, for instance, rayon, nylon and so on.

However, in the case of large size tires such as those used on trucks, it is not possible, in general, to use armours of textile material, mainly due to the fact that the tension stress on the armour increases due to the increased size of the tire, and to the higher inflation pressures required. In fact the critical tension stresses are likely to reach a value of several tons, and therefore a reinforcement of textile material would have to be formed of a very great number of layers, and would consequently have a prohibitive thickness.

In such conditions, it has been suggested to provide an armour generally comprising one or more layers of metal cords. This arrangement solves the problem of obtaining a sufficient resistance with armour of permissible thickness values, but involves some secondary disadvantages. For example, the steel forming the cords of the armour is, in fact, very easily subjected to the action of moisture. When water or moisture penetrate towards the armour through cracks, perforations or breaks occurring in the tread, the armour becomes rusty in a short time, therefore losing a great part of its strength.

It has also been proposed, for other purposes, to insert mixed structures in the tires comprising metal and textile material. For example, it has been proposed to use one or more additional strips of textile material in combination with special armours which generate transversal forces whose sense is periodically reversed to eliminate these forces. These strips, however, have no purposes other than the above indicated one, and cannot cooperate with the armour in resisting inflation pressure.

It has also been proposed to provide additional strips of textile material in combination with metal armour to absorb the tension stress due to the inflation pressure, but these strips have been able to absorb only a negligible part of the stress due to the large difference of extensibility existing between them and the metal armour with which they are combined. This is particularly evident in the case of removable tread tires (to which the present invention is preferably applicable), since such tires have, in general, an armour constituted by longitudinal metal cords. It is clear, that, in this case, the metal armour is practically inextensible with respect to the textile strips of a known type, and therefore the armour withstands substantially the whole tension stress.

It is therefore an object of the present invention to provide a pneumatic tire having a tread of mixed structure, including metal and textile material, which does ot have the above indicated disadvantages.

It is another object of the present invention to provide a pneumatic tire having a textile material which maintains the advantages of the already known solutions, co-operates with a metallic armour, and absorbs a portion of the tension stresses due to the inflation pressure.

In general, the present invention provides a pneumatic tire for vehicle wheels having a tread provided with an armour constituted by one or more layers having a width approximately equal to that of the tread. A plurality of metal cords are provided in the tread which are parallel to one another in each layer, and are crossed with respect to the cords of an adjacent layer, said cords being inclined at angles ranging from 5° to 30° with respect to the longitudinal direction. One of the main features of the tread of the tire of the present invention is that, in a position radially external with respect to the armour, one or more layers are provided which have a width about equal to that of the tread and which are formed by cords parallel to one another and disposed in longitudinal direction, said longitudinal cords being constituted by a textile material which undergoes shrinkage when subjected to the action of heat.

According to a preferred embodiment of the invention, the textile layer or layers are formed by a single cord, helically wound, the coils of the helix being disposed in longitudinal directions.

According to a further preferred embodiment of the invention, the textile layers are formed by strips disposed side-by-side, each of the strips having a width equal to a fraction of the width of the tread, and extending longitudinally along the whole development of the tire.

The invention will now be better illustrated with reference to the attached drawngs, given by way of nonlimiting example, in which.

Figure 1:
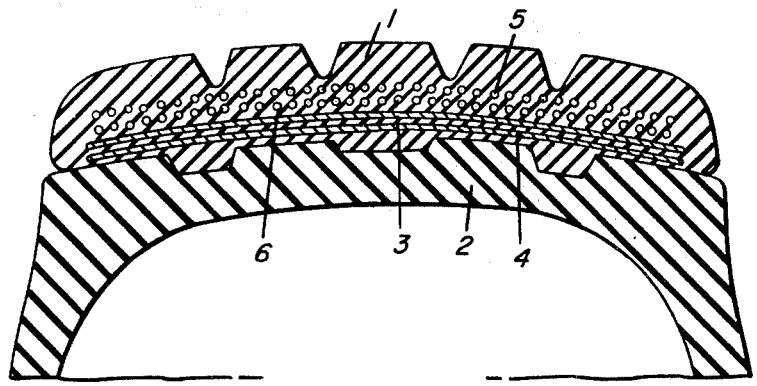
FIG. 1 represents, partially and in section, a pneumatic tire according to the present invention.
Figure 2:
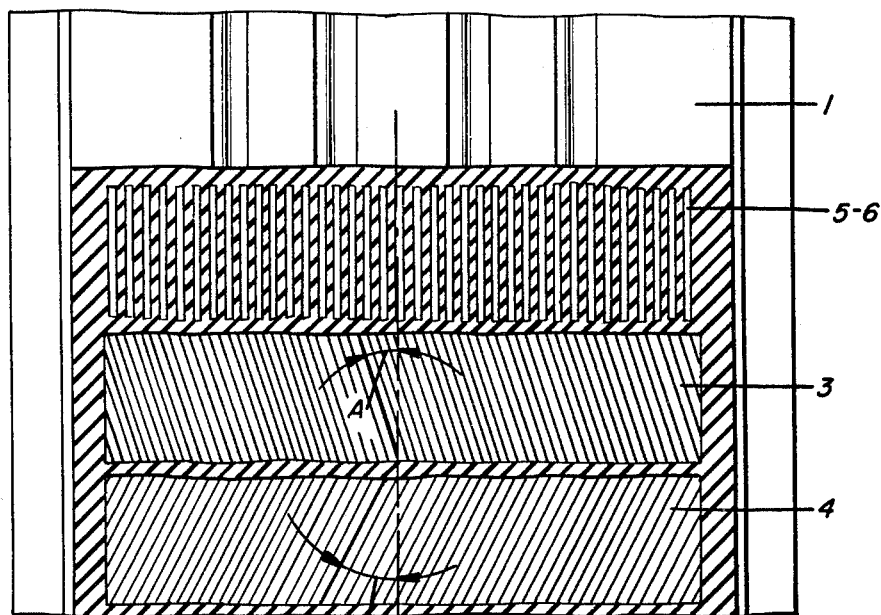
FIG. 2 represents, in plan view, the tread ring of the pneumatic tire shown in FIG. 1, with parts broken away to illustrate the angular relationship between the various cords.

Referring specifically to FIGS. 1 and 2, the reference numeral 1 refers to a tread band mounted on a carcass casing 2.

Figure 3:
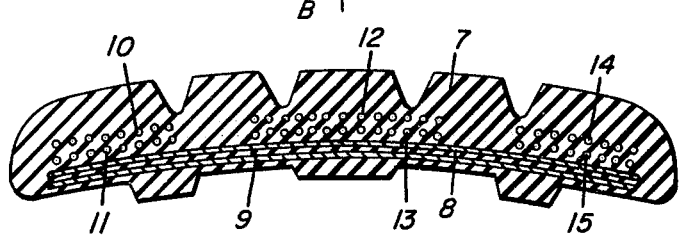
FIG. 3 represents a tread ring according to an alternative embodiment of the invention.

The tread band 1 includes a metal armour formed by two layers 3 and 4 of metal cords parallel to one another in each layer, and inclined respectively at angles A=16° and B=16°, with respect to the longitudinal direction. These two layers are formed by 7 x 3/0.15 cords in a number of 40 cords/dm. As is seen in FIGURES 1 to 3, the layers 3 and 4 of metal cords are separate and independent of each other.

In a radially outward position with respect to the strips 3 and 4, there are provided two layers 5 and 6 formed by a single nylon cord, count 840/3 x 3, helically wound, the coils of the helix being disposed in the longitudinal direction The arrangement of layers 3 and 4 of metal armour and the layers 5 and 6 of the textile cord is important in two respects.

First of all, since the metal cords of layers 3 and 4 are inclined with respect to the longitudinal direction, they are more extensible than armour formed by metal cords extending in a straight longitudinal direction. Secondly, the textile cord is made of a material—preferably nylon—which tends to shrink when it is subjected to the action of heat. Thus the longitudinal coils of the helical textile cord normally would tend to shrink in response to the heat treatment undergone during the vulcanization of the tire, this shrinkage tendency taking place upon removal of the tire from the mold. However, in the tire according to the present invention, the presence of the metal armour, which has also a considerable resistance to compression, substantially prevents the shrinkage of the textile cord.

Thus when the tire is cooled, the textile coils are in a condition of pretension which reduces their extensibility, and which makes their dynamometric characteristics more similar to those of the underlying metal armour. Obviously, this permits the textile coils to withstand a large portion of the tension stresses.

FIG. 3 illustrates an alternative embodiment in which the tread band 7 is provided with three double layer groups of strips extending over the layers 8 and 9 (analogous to the layers 3 and 4 of FIG. 1). These strips are indicated by the numerals 10 and 11, 12 and 13, 14 and 15, respectively, each of which has a width equal to a fraction of the length of the tread, the three groups of strips being disposed side-by-side so as to cover practically the whole width of the underlying armour strips 8 and 9.

Of course, variations of the specific construction and arrangement of this type mechanism herein disclosed can be made by those skilled in the art.

What is claimed is:

1. A pneumatic tire for vehicle wheels having a tread provided with at least two independent and separate layers of metal cords extending parallel to one another in each layer and being crossed with respect to the cords of an adjacent layer, said cords being inclined at angles ranging from 5° to 30° with respect to the longitudinal direction, each said layer having a width approximately equal to that of the tread; and at least one layer of textile cords positioned radially outward with respect to said layers of metallic cords and having a width approximately equal to that of the tread and being formed by cords parallel to one another and disposed in a longitudinal direction, said longitudinal textile cords being of a material which undergoes a shrinkage when subjected to the action of heat and having been subject to such heat while on the tire whereby the textile cords are in a pre-stressed condition having a tendency to shrink longitudinally but being restrained against such shrinkage by the resistance of said metallic cords.

2. A pneumatic tire as in claim 1, characterized in that the longitudinal textile cords are made of nylon.

3. A pneumatic tire as in claim 1, wherein each layer of textile cords is formed by a single cord, helically wound, the coils of the helix being disposed in the longitudinal direction.

4. A pneumatic tire as in claim 1, wherein each layer of textile cords is formed by a plurality of strips disposed side-by-side, each of the strips having a width equal to a fraction of the width of the tread and extending longitudinally along the whole development of the tire.

5. A pneumatic tire for vehicle wheels having a tread provided with at least two independent and separate layers of metal cords extending parallel to one another in each layer and being crossed with respect to the cords of an adjacent layer, said cords being inclined with respect to the longitudinal direction; and at least one layer of textile cords positioned radially outward with respect to said layers of metallic cords and being formed by cords parallel to one another and disposed in a longitudinal direction, said longitudinal textile cords being of a material which undergoes shrinkage when subjected to the action of heat, and having been subjected to such heat while on the tire whereby the textile cords are in a prestressed condition having a tendency to shrink longitudinally but being restrained agaainst such shrinkage by the resistance of said metallic cords.

6. A pneumatic tire as in claim 5, characterized in that the longitudinal textile cords are made of nylon.

7. A pneumatic tire as in claim 5, wherein each layer of texile cords is formed by a single cord, helically wound, the coils of the helix being disposed in the longitudinal direction.

8. A pneumatic tire as in claim 5, wherein each layer of textile cords is formed by a plurality of strips disposed side-by-side, each of the strips having a width equal to a fraction of the width of the tread and extending longitudinally along the whole development of the tire.

References Cited

UNITED STATES PATENTS

| | | | |
|---|---|---|---|
| 2,225,042 | 12/1940 | Elliott | 152—356 |
| 3,126,042 | 3/1964 | Cegnar | 152—361 |
| 2,930,425 | 3/1960 | Lugli et al. | 152—354 |
| 2,985,214 | 5/1961 | Lugli | 152—361 |
| 3,224,482 | 12/1965 | Barassi et al. | 152—361 |

FOREIGN PATENTS 855,662  12/1960  Great Britain.

ARTHUR L. LA POINT, Primary Examiner

C. B. LYON, Assistant Examiner

U.S. Cl. X.R.

152—361